United States Patent
Iyasu et al.

(10) Patent No.: US 9,692,307 B2
(45) Date of Patent: Jun. 27, 2017

(54) POWER CONVERSION APPARATUS

(71) Applicant: DENSO CORPORATION, Kariya, Aichi-pref. (JP)

(72) Inventors: Seiji Iyasu, Anjo (JP); Kimikazu Nakamura, Handa (JP); Yuuichi Handa, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/863,801

(22) Filed: Sep. 24, 2015

(65) Prior Publication Data

US 2016/0094134 A1 Mar. 31, 2016

(30) Foreign Application Priority Data

Sep. 25, 2014 (JP) .................. 2014-194819

(51) Int. Cl.
*H02M 3/335* (2006.01)
*H02M 3/337* (2006.01)
*H02M 1/00* (2006.01)
*H02M 1/32* (2007.01)

(52) U.S. Cl.
CPC ..... *H02M 3/33515* (2013.01); *H02M 3/3378* (2013.01); *H02M 3/3353* (2013.01); *H02M 3/33569* (2013.01); *H02M 2001/0019* (2013.01); *H02M 2001/325* (2013.01)

(58) Field of Classification Search
CPC ........... H02M 3/33515; H02M 3/3378; H02M 3/3353; H02M 3/33569; H02M 2001/0019; H02M 2001/325
See application file for complete search history.

(56) References Cited

U.S. PATENT DOCUMENTS 4,616,302 A * 10/1986 Mandelcorn ......... H02H 7/1213
                                                            363/50
5,485,077 A *  1/1996 Werrbach ................ G05F 1/565
                                                            323/285
5,770,940 A *  6/1998 Goder ..................... G05F 1/565
                                                            323/282

(Continued)

FOREIGN PATENT DOCUMENTS

JP       2005-045945 A       2/2005

*Primary Examiner* — Jue Zhang
(74) *Attorney, Agent, or Firm* — Oliff PLC

(57) ABSTRACT

Power conversion apparatus converts input voltage and supplies output voltage to the electric load. The apparatus includes a semiconductor switch switches between open and closed states to regulate voltage control current for controlling output voltage, a first voltage detection section detects remote voltage being applied to the electric load as output voltage, a second voltage detection section detects a local voltage being applied to the output terminal as output voltage, a target current calculation section calculates target current which is the voltage control current target value, based on voltage deviation between target voltage which is the output voltage target value and either remote voltage or local voltage, and a switch control section controls the semiconductor switch so voltage control current becomes target current, to regulate output voltage to target voltage. The target current calculation section calculates the target current by using one of the remote or local voltage corresponds to a smaller target current.

10 Claims, 7 Drawing Sheets

(56) References Cited

U.S. PATENT DOCUMENTS

| | | | | |
|---|---|---|---|---|
| 5,977,757 A | * | 11/1999 | Felps | G05F 1/613 |
| | | | | 323/282 |
| 6,774,612 B1 | * | 8/2004 | Ballenger | H02M 3/156 |
| | | | | 323/273 |
| 2011/0101937 A1 | * | 5/2011 | Dobkin | H02M 3/156 |
| | | | | 323/282 |

* cited by examiner

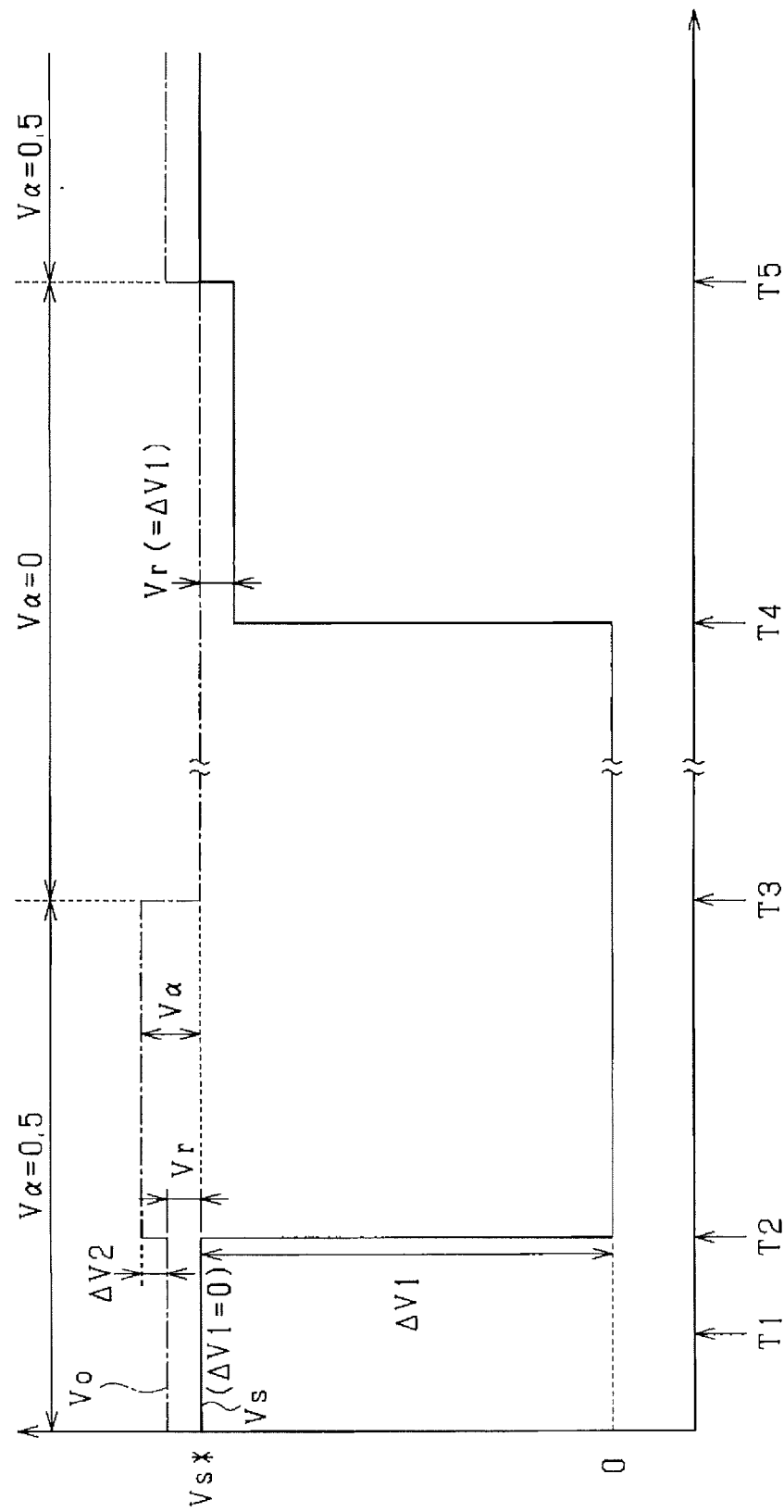

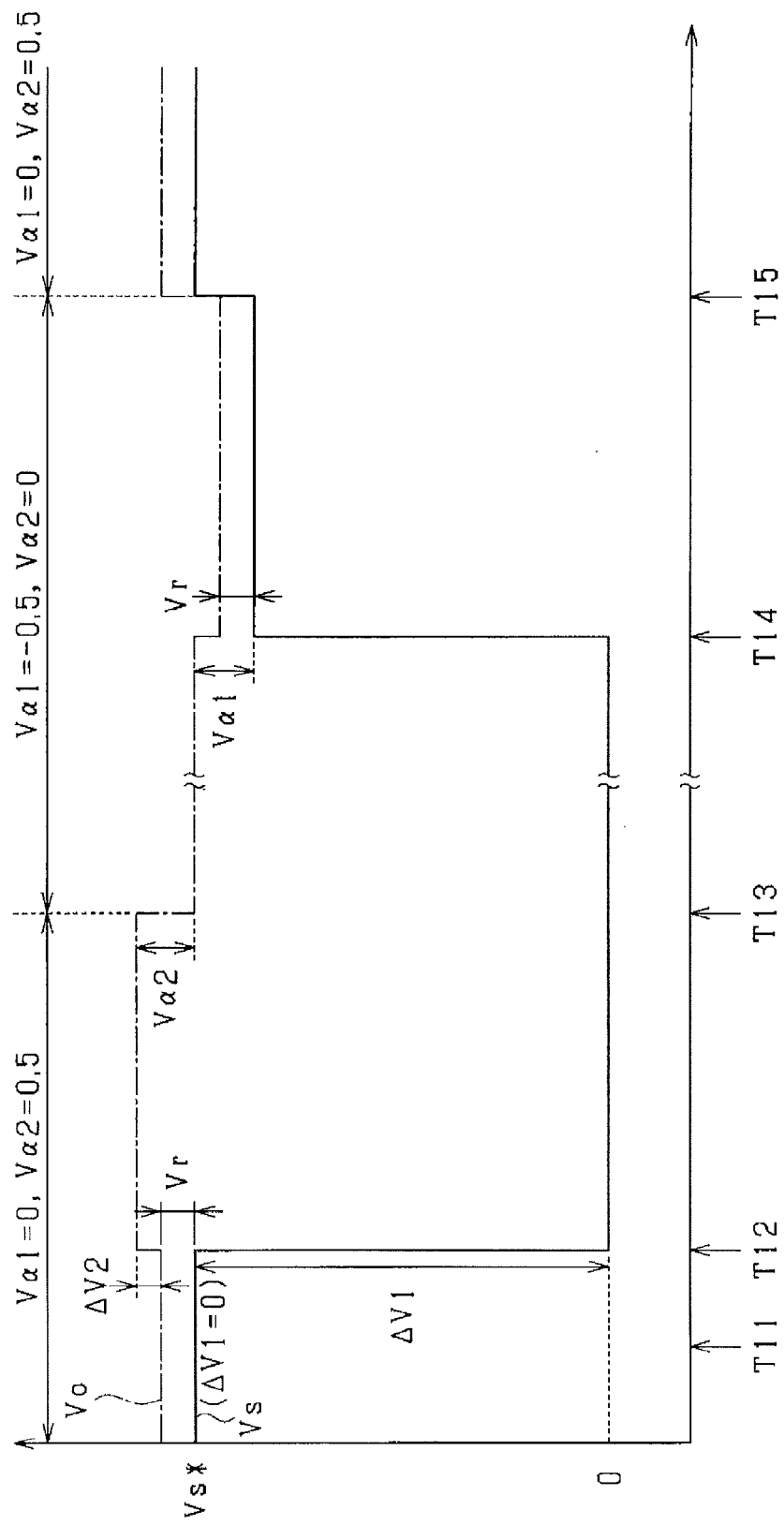

POWER CONVERSION APPARATUS

CROSS-REFERENCE TO RELATED APPLICATION

This application is based on and claims the benefit of priority from earlier Japanese Patent Application No. 2014-194819 filed Sep. 25, 2014, the description of which is incorporated herein by reference.

BACKGROUND (Technical Field)

The present invention relates to a power conversion apparatus which converts input voltage, and supplies output voltage to an electrical load.

(Related Art)

A technique for a power conversion apparatus is known in which input voltage is converted, and output voltage is supplied to an electric load. In the technique, to compensate for a voltage drop due to interconnection resistance between an output terminal and the electric load, voltage applied to the electric load (remote voltage) is detected to regulate the output voltage based on the detected value. Herein, in an in-vehicle power conversion apparatus which vibrates strongly, disconnection between a remote voltage detection means and the power conversion apparatus or disconnection of a terminal of the remote voltage detection means may be caused.

According to the configuration disclosed in JP-A-2005-45945, the voltage of an output terminal of a power conversion apparatus (local voltage) and the voltage applied to an electric load (remote voltage) are detected. Then, PWM signals are generated based on the respective local voltage and remote voltage to perform switching control by selecting the signal having smaller duty. According to the configuration, when an abnormality is caused in detecting the remote voltage, the output voltage can be controlled based on the local voltage without becoming an uncontrolled state.

The configuration disclosed in JP-A-2005-45945 generates a PWM signal from a detection value of voltage, and has lower responsiveness when the load fluctuates. In addition, the configuration in which PWM signals are generated based on the respective local voltage and remote voltage has a number of parts.

SUMMARY

An embodiment provides a power conversion apparatus which performs control based on a local voltage when an abnormality is caused in a remote voltage detection section, and has higher responsiveness and a smaller number of parts.

In a power conversion apparatus according to one embodiment, an output terminal is connected to an electric load. The power conversion apparatus converts an input voltage and supplies an output voltage to the electric load. The power conversion apparatus includes: a semiconductor switch which switches between an open state and a closed state to regulate a voltage control current for controlling the output voltage; a first voltage detection section which detects a remote voltage which is applied to the electric load as the output voltage; a second voltage detection section which detects a local voltage which is applied to the output terminal as the output voltage; a target current calculation section which calculates a target current which is a target value of the voltage control current, based on a voltage deviation between a target voltage which is a target value of the output voltage and either the remote voltage or the local voltage; and a switch control section which controls the semiconductor switch so that the voltage control current becomes the target current, to regulate the output voltage to the target voltage. The target current calculation section calculates the target current by using whichever one of the remote voltage and the local voltage corresponds to a smaller target current.

BRIEF DESCRIPTION OF THE DRAWINGS

In the accompanying drawings:

FIG. 3 is a timing diagram showing an operation when a connection abnormality is caused according to the first embodiment;

FIG. 8 is a timing diagram showing an operation when a connection abnormality is caused according to the fourth embodiment.

DETAILED DESCRIPTION OF THE PREFERRED EMBODIMENTS

Figure 1:
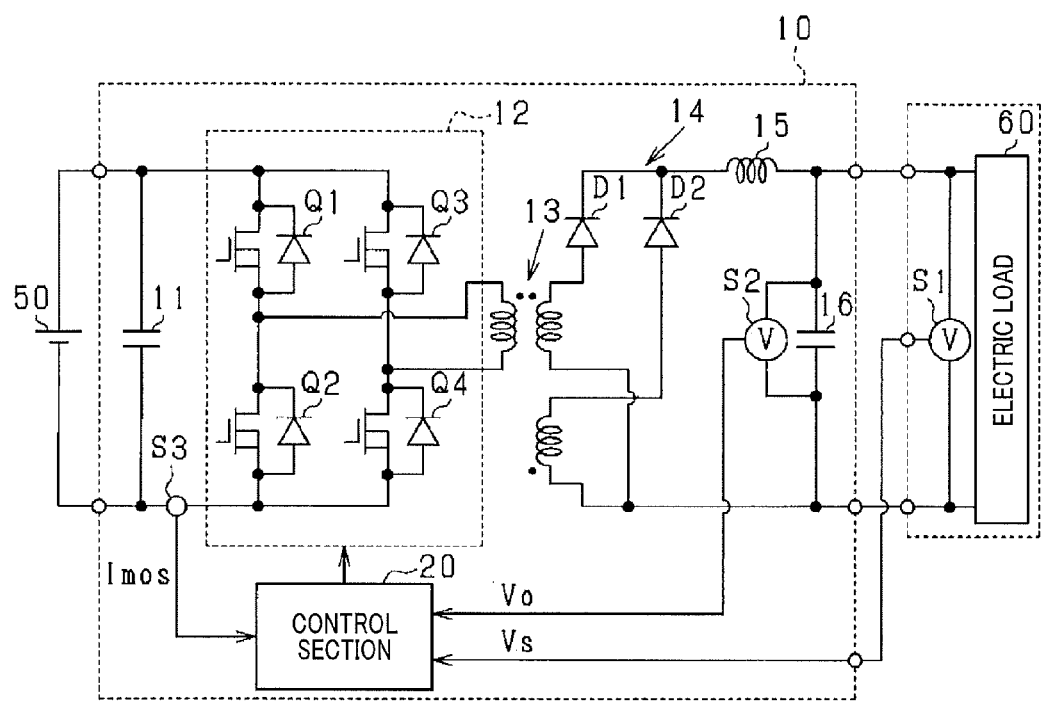
FIG. 1 is a diagram showing an electrical configuration of a power conversion system.

With reference to the accompanying drawings, hereinafter are described some embodiments of the present invention. It should be noted that, in the following embodiments, the components identical with or similar to each other between the embodiments are given the same reference numerals.

(First embodiment)

FIG. 1 shows a power conversion system of the present embodiment. In the power conversion system, input terminals of a power conversion apparatus 10 are connected to a secondary battery 50. Output terminals of the power conversion apparatus 10 are connected to an electric load 60. The power conversion apparatus 10 is connected to the secondary battery 50, which is a DC power source, in parallel. From the secondary battery 50, DC power is supplied. The power conversion apparatus 10 converts input voltage supplied from the secondary battery 50, and outputs the converted input voltage. The electric load 60 is a drive load which is supplied with DC power, whose voltage is increased or decreased to a predetermined voltage by the power conversion apparatus 10, and is driven. Alternatively, the electric load 60 may be, instead of the drive load, a secondary battery to be charged.

The power conversion apparatus 10 includes an inverter 12 and a full-wave rectifier circuit 14. The inverter 12 is connected to the secondary battery 50 via an input side smoothing capacitor 11.

The inverter 12 is a full-bridge type and is configured by four semiconductor switches Q1 to Q4. The semiconductor switches Q1 to Q4 are configured by MOSFETs. The inverter 12 converts DC power supplied from the secondary battery 50 into AC power having a predetermined frequency.

Note that the input side smoothing capacitor 11 mainly restrains noise due to the switching operation of the inverter 12 from being introduced to the secondary battery 50 side.

The inverter 12 is connected to the primary coil of a transformer 13. The transformer 13 increases or decreases electric power inputted to the primary coil from the inverter 12 and outputs the increased or decreased electric power to the secondary coil. The secondary coil of the transformer 13 is connected to the full-wave rectifier circuit 14.

The full-wave rectifier circuit 14 is a center tap type and is configured by two diodes D1, D2. The full-wave rectifier circuit 14 converts AC power inputted from the secondary coil of the transformer 13 into DC power and outputs the DC power to an inductor 15. The inductor 15 stores the supplied DC power and outputs the DC power to the electric load 60 via an output side smoothing capacitor 16 which smooths output voltage.

A remote voltage sensor S1 (first voltage detection section (means)) is provided between the both terminals of the electric load 60. A local voltage sensor S2 (second voltage detection section (means)) is provided between the both terminals of the output side smoothing capacitor 16. The remote voltage sensor S1 detects voltage applied to the electric load 60. The local voltage sensor S2 detects voltage outputted from the output terminals of the power conversion apparatus 10. In addition, a current sensor S3 is provided on a path connecting the input side smoothing capacitor 11 and the inverter 12.

A control section 20 controlling the inverter 12 obtains a detection value Vs of the remote voltage sensor S1 and a detection value Vo of the local voltage sensor S2. In addition, the control section 20 obtains a detection value of the current sensor S3 as a switch current Imos which is a current (voltage control current) flowing to the semiconductor switches Q1 to Q4 of the inverter 12. The control section 20 performs peak current mode control for the inverter 12 based on the obtained detection values Vs, Vo, Imos. Hereinafter, the control performed by the control section 20 of the present embodiment is described.

Figure 2:
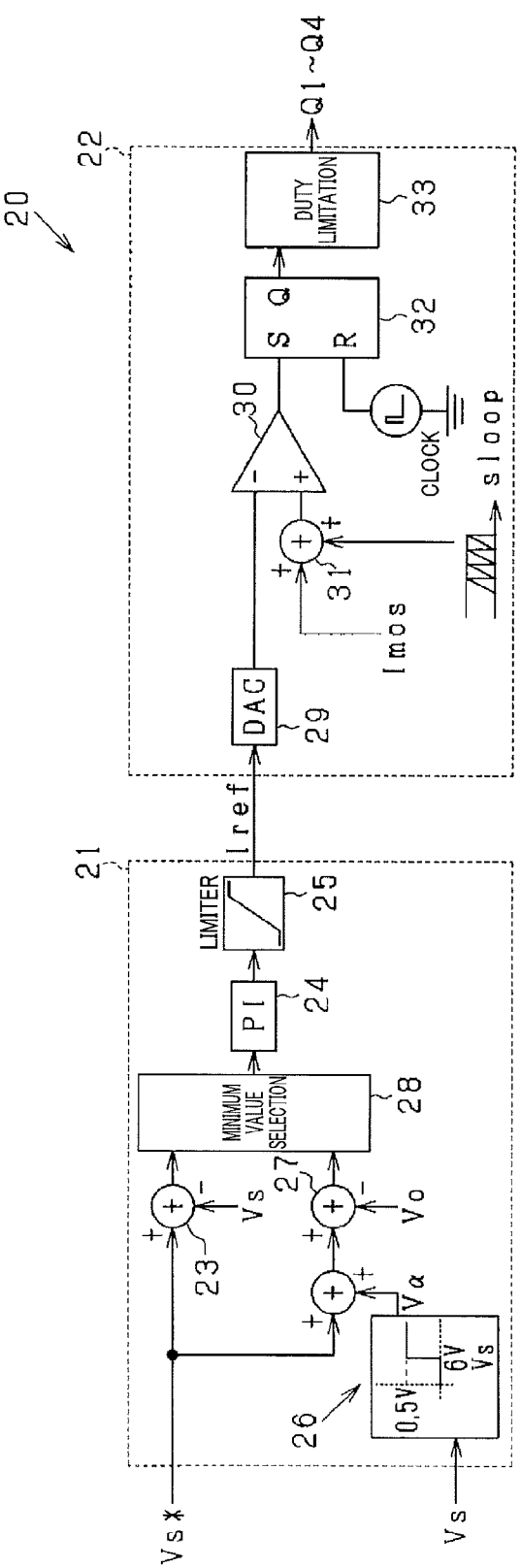
FIG. 2 is a functional block diagram showing a control section of a first embodiment.

FIG. 2 shows a functional block diagram of the control section 20. The control section 20 performs constant voltage control so that the remote voltage Vs becomes a constant voltage value equal to a target voltage Vs*. In addition, the control section 20 includes a target current calculation section (means) 21 and a peak current control section 22 (switch control section (means)). The target current calculation section 21 calculates a target current Iref based on the detection values Vs, Vo, Imos. The peak current control section 22 performs peak current mode control which regulates the current Imos, which is the voltage control current, so as to be the target current Iref.

The control section 20 receives a predetermined target voltage Vs*. The target voltage Vs* is set to an output voltage (operating voltage of the electric load 60) suited to the operation of the electric load 60. A first deviation calculation section 23 calculates the deviation between the target voltage Vs* and the remote voltage Vs. The deviation calculated by the first deviation calculation section 23 is inputted to a PI control section 24 (proportional integral control section (means)).

The PI control section 24 outputs the sum of the value proportional to the deviation and the value proportional to the time integration value of the deviation as the target current Iref, which is a target value of the current Imos, to the peak current control section 22, to decrease the deviation. Herein, the target current Iref, which is an output of the PI control section 24, is limited so as to be within a range between a predetermined upper limit and a predetermined lower limit and is outputted to the peak current control section 22. The limitation of the target current Iref by a current limiting section 25 mainly aims to restrain overcurrent in the semiconductor switches Q1 to Q4.

A DA converter 29 of the peak current control section 22 converts the inputted target current Iref from a digital value to an analog value. Then, the target current Iref, which is converted to the analog value, is inputted to a negative terminal of a comparator 30. In addition, the switch current Imos and a slope compensation signal are inputted to an adder 31 of the peak current control section 22. Then, the sum of the switch current Imos and the slope compensation signal (switch current after compensation) is inputted to a positive terminal of the comparator 30 from the adder 31. Note that the slope compensation signal restrains oscillation due to the variation in current flowing through the inductor 15.

The comparator 30 compares the target current Iref with the switch current after compensation, and inputs a signal in a high state into the S terminal of an RS flip-flop 32 during a time period during which the switch current after compensation is smaller than the target current Iref. In addition, a clock signal is inputted into the R terminal of the RS flip-flop 32. An output of the RS flip-flop 32 is set to an upper limit of duty by a duty limitation section 33 and is outputted to a gate circuit driving the semiconductor switches Q1 to Q4.

While the semiconductor switches Q1, Q4 or the semiconductor switches Q2, Q3 are in on states (closed state), the switch current Imos increases as reactor current flowing through the inductor 15 increases. Then, if the switch current Imos becomes equal to the target current Iref, the output of the comparator 30 changes from a high state to a low state. Thereby, the semiconductor switches Q1, Q4 or the semiconductor switches Q2, Q3 are turned off (opened state). While the semiconductor switches Q1, Q4 or the semiconductor switches Q2, Q3 are in off states (closed state), the reactor current decreases. At the timing when a clock is inputted to the RS flip-flop 32, the semiconductor switches Q1, Q4 or the semiconductor switches Q2, Q3 are turned on again, whereby the reactor current and the switch current Imos increase.

Herein, as shown in FIG. 1, the remote voltage sensor S1 is connected to the terminals of the electric load 60, and is installed separately from the control section 20. Hence, it is concerned that a connection abnormality may be caused such as disconnection of the terminal and disconnection between the remote voltage sensor S1 and the control section 20.

Hence, in the present embodiment, when the connection abnormality concerning the remote voltage sensor S1 is caused, the target current Iref is calculated based on the deviation between the local voltage Vo, which is a detection value of the local voltage sensor S2, and the target voltage Vs*.

Specifically, a correction section 26 adds a correction value Vα to the target voltage Vs* to correct the target voltage Vs*. A second deviation calculation section 27 calculates a deviation Δ2 between the target voltage Vs* after the correction and the local voltage Vo. Then, a minimum value selection section 28 selects the smaller deviation from a deviation Δ1 calculated by the first deviation calculation section 23 and a deviation Δ2 calculated by the second deviation calculation section 27. Then, the PI control section 24 performs PI control based of the deviation selected by the minimum value selection section 28 to calculate the target current Iref. Herein, a detection period of the remote voltage Vs of the remote voltage sensor S1 and a detection period of the local voltage Vo of the local voltage sensor S2 are set to be the same. Specifically, both the detection periods of the remote voltage Vs and the local voltage Vs are 10 μs. In addition, the calculation period of the target current Iref and the detection period of the local voltage Vo and the remote voltage Vs are set so as to be synchronized with each other.

The correction section 26 adds a correction value Vα to the target voltage Vs*. The correction value Vα is 0V when a connection abnormality has been caused in the remote voltage sensor S1. The correction value Vα is 0.5 V when the remote voltage sensor S1 is normal. Regarding the connection abnormality of the remote voltage sensor S1, the correction section 26 determines that the remote voltage sensor S1 is normal if the remote voltage Vs is equal to or more than a predetermined value (6V=½×Vs*), and determines that the remote voltage sensor S1 is abnormal if the remote voltage Vs is less than the predetermined value. Herein, the correction value Vα (0.5V) at normal time is set to a value larger than a voltage drop Vr caused in lines between the power conversion apparatus 10 and the electric load 60. Specifically, the correction value Vα at normal time is a value larger than the product of the maximum value of output current of the power conversion apparatus 10 and an interconnection resistance between the output terminals of the power conversion apparatus 10 and the electric load 60.

An operation of the power conversion apparatus 10 is explained by using the timing diagram shown in FIG. 3. At time T1, the remote voltage sensor S1 operates normally. Hence, the deviation Δ1 is smaller than the deviation Δ2, whereby the control based on the remote voltage Vs is performed.

At time T2, a connection abnormality between the remote voltage sensor S1 and the control section 20 is caused. Hence, since the deviation Δ2 becomes smaller than the deviation Δ1, the control based on the deviation Δ2 is performed. At time T3, due to a lapse of a predetermined time period, the correction value Vα becomes from 0.5V to 0V. Thereby, the local voltage Vo becomes equal to the target voltage Vs*.

At time T4, the remote voltage sensor S1 becomes normal. At time T5, due to a lapse of a predetermined time period from the time when the remote voltage sensor S1 has become normal, the value of the correction value Vα becomes from 0V to 0.5V. Thereby, the deviation Δ2 becomes a value (0.5V) equal to the correction value Vα. The deviation Δ1 at time T5 corresponds to the voltage drop Vr caused in the lines connecting between the power conversion apparatus 10 and the electric load 60. Since the correction value Vα at normal time is set to be larger than the voltage drop Vr, the deviation Δ1 becomes smaller than the deviation Δ2 at time T5. Hence, at time T5 or later, the control based on the deviation Δ1, that is, the control based on the remote voltage Vs is performed.

Figure 4A:
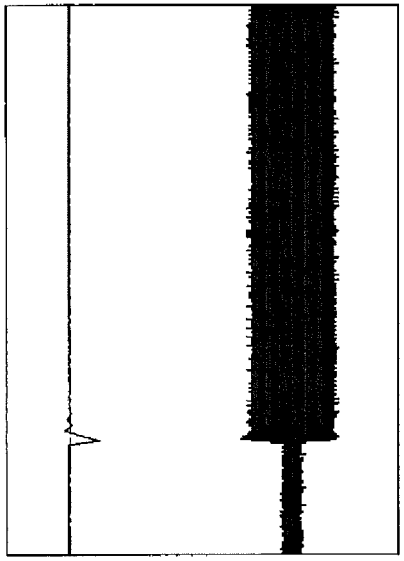
FIGS. 4A to 4D are timing diagrams showing operations when the load current is changed according to the first embodiment.
Figure 4B:
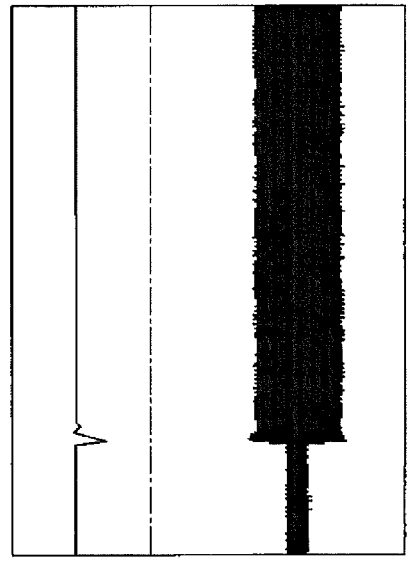
Figure 4C:
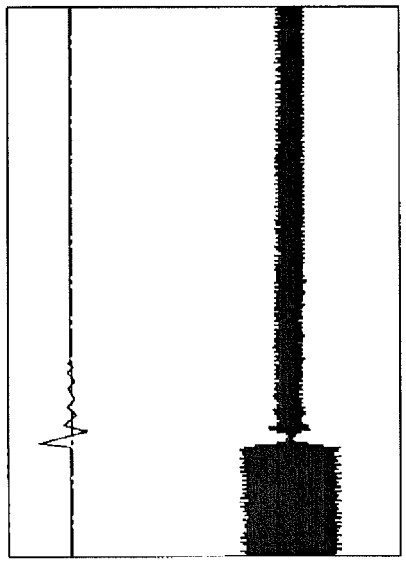
Figure 4D:
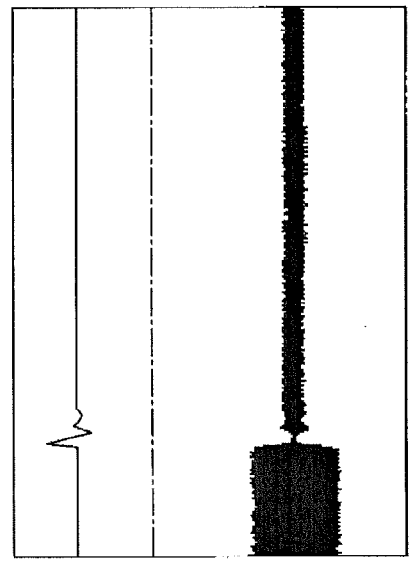

FIG. 4A and FIG. 4B show timing diagrams obtained when load current is changed in a case where control based on one of the remote voltage Vs and the local voltage Vo is performed. FIG. 4A shows variations of the remote voltage Vs, the local voltage Vo, and the switch current Imos when load current decreases (80A→10A) in a case where control based on the remote voltage Vs is performed. FIG. 4B shows variations of the remote voltage Vs, the local voltage Vo, and the switch current Imos when load current increases (10A→80A) in a case where control based on the remote voltage Vs is performed. FIG. 4C shows variations of the remote voltage Vs, the local voltage Vo, and the switch current Imos when load current decreases (80A→10A) in a case where control based on the local voltage Vo is performed. FIG. 4D shows variations of the remote voltage Vs, the local voltage Vo, and the switch current Imos when load current increases (10A→80A) in a case where control based on the local voltage Vo is performed.

Comparing FIG. 4A with FIG. 4C, and Fig. B with FIG. 4D, it can be seen that the power conversion apparatus 10 operates with substantially identical responsiveness between the state where the control based on the remote voltage Vs is performed and the state where the control based on the local voltage Vo is performed.

Hereinafter, advantages of the present embodiment are described.

The power conversion apparatus 10 of the present embodiment is a power conversion apparatus using a current mode control scheme in which the target current Iref is calculated based on the deviation Δ1 between the target voltage Vs* and the remote voltage Vs which is a detection value of output voltage to control the semiconductor switches Q1 to Q4 so that the switch current Imos, which is a voltage control current, reaches the target current Iref. Hence, the power conversion apparatus 10 can perform the control with high responsiveness compared with a scheme in which a PWM signal is generated from the detection value of voltage.

In addition, the power conversion apparatus 10 detects output voltage by using the two voltage sensors S1, S2. Then, the power conversion apparatus 10 calculates the target current Iref based on the voltage deviations Δ1, Δ2 between one of the remote voltage Vs and the local voltage Vo, which are detection values obtained by the voltage sensors S1, S2, respectively, and the target voltage Vs*. Hence, even when an abnormality is caused in one of the voltage sensors S1, S2, voltage output can be continued with good responsiveness. In addition, the power conversion apparatus 10 calculates the target current Iref by using one of the remote voltage Vs and the local voltage Vo by which the target current Iref becomes smaller. Hence, when an abnormality is caused in one of the voltage sensors S1, S2, output voltage can be restrained from varying. In addition, the target current calculation section 21 is not required to use analog circuits, whereby the number of parts can be restrained from increasing.

In addition, when the target current Iref based on the remote voltage Vs and the target current Iref based on the local voltage Vo are switched therebetween, the power conversion apparatus 10 using a current mode control scheme can prevent the delay due to the switching and restrain the output voltage from being unstable.

On condition that the remote voltage sensor S1 is normal, the control based on the remote voltage Vs can be performed by correcting the deviation Δ2 between the local voltage Vo and the target voltage Vs* so as to increase by a predetermined amount. In addition, on condition that an abnormality is caused in the remote voltage sensor S1, the correction is not performed by which the deviation Δ2 between the local voltage Vo and the target voltage Vs* increases by a predetermined amount. Thereby, when a connection abnormality is caused in the remote voltage sensor S1, the control is performed by which the local voltage Vo becomes equal to the target voltage Vs*. Thereafter, when the remote voltage sensor S1 returns to normal, the deviation Δ2 between the local voltage Vo and the target voltage Vs* becomes larger.

Hence, switching from the control based on the local voltage Vo to the control based on the remote voltage Vs can be promptly performed.

When the control based on the remote voltage Vs is performed, the voltage supplied to the electric load 60 approaches the target voltage Vs*. Hence, electric power can be appropriately supplied to the electric load 60. Accordingly, when the remote voltage sensor S1 returns to normal after a connection abnormality is caused in the remote voltage sensor S1, the output voltage can be appropriately controlled.

In addition, in the present embodiment, the correction value Vα used when the remote voltage sensor S1 is normal is set to a value larger than the voltage drop Vr. Thereby, the deviation Δ1 between the remote voltage Vs and the target voltage Vs* at the time when the remote voltage sensor S1 returns to normal reliably becomes a value smaller than the deviation Δ2 between the local voltage Vo and the corrected target voltage Vs*+Vα. Accordingly, when the remote voltage sensor S1 returns to normal, the control based on the detection value Vs is performed.

(Second embodiment)

Figure 5:
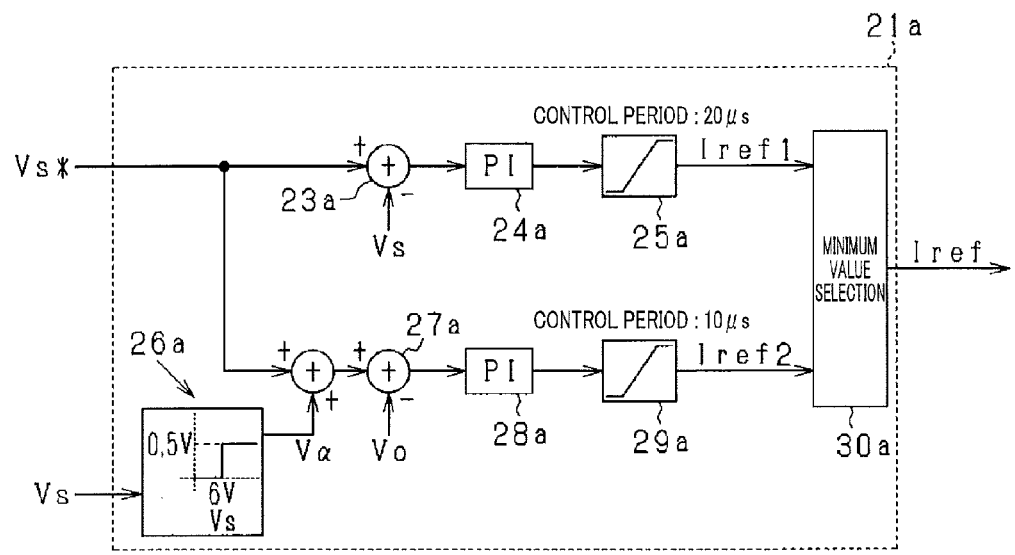
FIG. 5 is a functional block diagram showing a target current calculation section of a second embodiment.

FIG. 5 shows a functional block diagram of a target current calculation section 21a of the second embodiment. Note that a power conversion apparatus of the present embodiment operates in a similar manner to the timing diagram shown in FIG. 3.

The target current calculation section 21a calculates a first target current Iref1 and a second target current Iref2 based on the remote voltage Vs and the local voltage Vo, respectively, and selects a smaller one from the first target current Iref1 and the second target current Iref2 as the target current Iref.

A first deviation calculation section 23a calculates the deviation ΔV1 between the target voltage Vs* and the remote voltage Vs. A PI control section 24a calculates a first target current Iref1 by performing PI control for the deviation Δ1. In addition, a correction section 26a performs correction by adding the correction value Vα to the target voltage Vs*. Herein, the correction value Vα is 0 V when a connection abnormality has been caused in the remote voltage sensor S1, and the correction value Vα is 0.5V when the remote voltage sensor S1 is normal. Vα used when the remote voltage sensor S1 is normal is set to be larger than the voltage drop Vr due to interconnection resistance between the power conversion apparatus 10 and the electric load 60.

A second deviation calculation section 27a calculates the deviation Δ2 between the target voltage (Vs*+Vα) corrected by the correction section 26a and the local voltage Vo. A PI control section 28a performs PI control for the deviation Δ2 to calculate a second target current Iref2.

Then, the first target current Iref1 and the second target current Iref2 are inputted into a minimum value selection section 30a via limiting sections 25a, 29a, which limit switch current Imos serving as voltage control current so as to be within a range between a predetermined upper limit and a predetermined lower limit. The minimum value selection section 30a selects a smaller one from the first target current Iref1 and the second target current Iref2 as the target current Iref and outputs the target current Iref to the peak current control section 22.

The first target current Iref1 is calculated by the PI control section 24a in synchronism with the detection period (20 μs) of the remote voltage Vs. The second target current Iref2 is calculated by the PI control section 28a in synchronism with the detection period (10 μs) of the local voltage Vo. Thus, the detection periods of the voltage sensors S1, S2 can be different from each other, whereby flexibility of design of the control section 20 of the power conversion apparatus 10 can be improved. In addition, in the configuration, the calculation period of the target current Iref and the detection period of the local voltage Vo are synchronism with each other. According to such a configuration, stability of the control can be improved.

Herein, it is assumed that the proportional gain in calculating the first target current Iref1 is set in accordance with the proportional gain in calculating the second target current Iref2. In this case, the first target current Iref1 is calculated in accordance with the detection period (10 μs) of the local voltage Vo, while the remote voltage Vs is not updated for 20 μs. Hence, when the control based on the first target current Iref1 is performed, it is considered that overvoltage (overshoot) is caused until the remote voltage Vs is updated. Hence, in the present embodiment, the gain of PI control in calculating the first target current Iref1 is set to be smaller than the gain of PI control in calculating the second target current Iref2. Thereby, when the output voltage is controlled based on the remote voltage Vs, the output voltage is restrained from being overvoltage (overshoot).

In addition, in a case where the proportional gain in calculating the second target current Iref2 by the PI control section 28a is set in accordance with the proportional gain in calculating the first target current Iref1 by the PI control section 24a, when the control based on the second target current Iref2 is performed, it is considered that the responsiveness lowers. Hence, in the configuration, the ratio of the proportional gain in calculating the first target current Iref1 by the PI control section 24a to the proportional gain in calculating the second target current Iref2 by the PI control section 28a is set to an inverse ratio (1:2) of a detection period (20 μs) of the remote voltage Vs to a detection period (10 μsec) of the local voltage Vo. According to the configuration, responsiveness under the control based on the remote voltage Vs and responsiveness under the control based on the local voltage Vo can be equal to each other, which can restrain overvoltage, and the responsiveness from lowering.

(Third embodiment)

Figure 6:
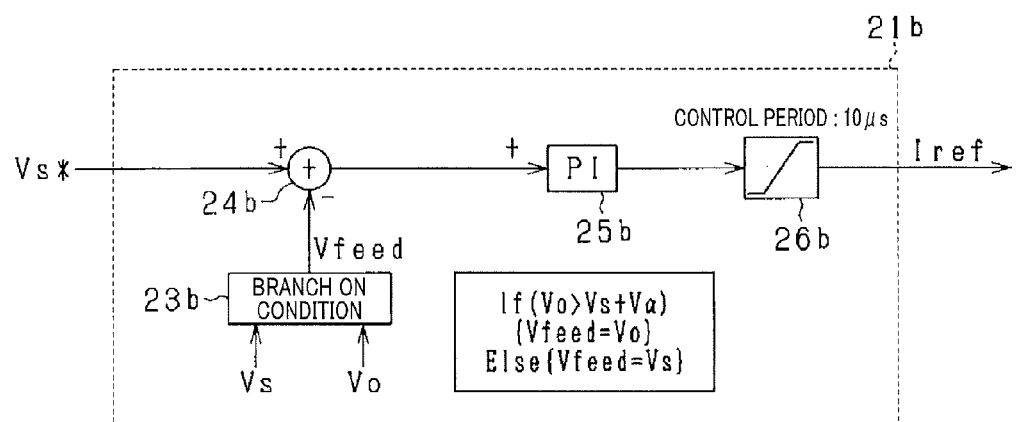
FIG. 6 is a functional block diagram showing a target current calculation section of a third embodiment.

FIG. 6 shows a functional block diagram of a target current calculation section 21b of the third embodiment. Note that a power conversion apparatus of the present embodiment operates in a similar manner to the timing diagram shown in FIG. 3.

The remote voltage Vs and the local voltage Vo are inputted to a voltage selection section 23b. The voltage selection section 23b compares a value obtained by adding the correction value Vα to the remote voltage Vs with the local voltage Vo. Then, if the value obtained by adding the correction value Vα to the remote voltage Vs is equal to or more than the local voltage Vo (Vs+Vα≥Vo), the voltage selection section 23b selects the remote voltage Vs as a controlled object voltage Vfeed and outputs the controlled object voltage Vfeed to a deviation calculation means 24b. In addition, if the value obtained by adding the correction value Vα to the remote voltage Vs is less than the local voltage Vo (Vo>Vs+Vα), the voltage selection section 23b selects the local voltage Vo as a controlled object voltage Vfeed and outputs the controlled object voltage Vfeed to the deviation calculation section 24b. Herein, the correction value Vα is 0 V when a connection abnormality has been caused in the remote voltage sensor S1. The correction value Vα is 0.5 V when the remote voltage sensor S1 is normal. Vα used when the remote voltage sensor S1 is normal is set to be larger than the voltage drop Vr caused due to interconnection resistance between the power conversion apparatus 10 and the electric load 60.

The deviation calculation section 24b calculates the deviation between the controlled object voltage Vfeed and the target voltage Vs*. A PI control section 25b performs PI control based on the deviation calculated by the deviation calculation means 24b to calculate the target current Iref. Then, the PI control section 25b outputs the target current Iref to the peak current control section 22 via a limiting section 26b which limits the target current Iref so as to be between an upper limit and a lower limit.

Herein, when the remote voltage sensor S1 is normal, the voltage selection section 23b sets the correction value Vα to a value larger than the voltage drop Vr caused due to interconnection resistance between the power conversion apparatus 10 and the electric load 60. Thereby, when the remote voltage sensor S1 is normal, the control based on the remote voltage Vs is performed. In addition, when the remote voltage sensor S1 is abnormal, the voltage selection section 23b sets Vα to 0V. Thereby, when the remote voltage sensor S1 becomes abnormal, the control based on the local voltage Vo is promptly performed. In addition, when the remote voltage sensor S1 returns to normal, the control based on the remote voltage Vs is performed because Vα is set to a value larger than the voltage drop Vr caused due to interconnection resistance.

(Fourth embodiment)

Figure 7:
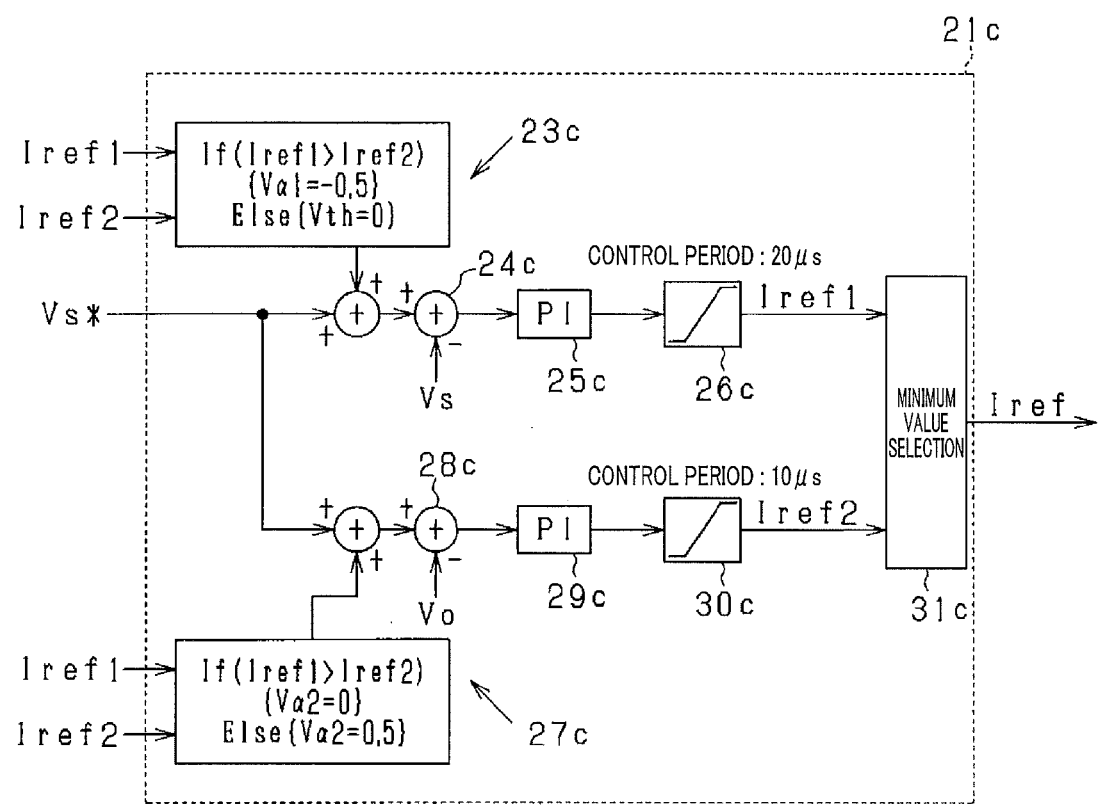
FIG. 7 is a functional block diagram showing a target current calculation section of a fourth embodiment.

FIG. 7 shows a functional block diagram of a target current calculation section 21c of the fourth embodiment.

A first correction section 23c of the target current calculation section 21c compares the first target current Iref1 with the second target current Iref2. If a state where the first target current Iref1 is larger than the second target current Iref2 (when the remote voltage sensor S1 is abnormal) is maintained for a predetermined time period, the first correction section 23c sets a correction value Vα1 to −0.5 V and adds the correction value Vα1 to the target voltage Vs*. In addition, if a state where the second target current Iref2 is equal to or smaller than the first target current Iref1 (when the remote voltage sensor S1 is normal) is maintained for a predetermined time period, the first correction section 23c sets the correction value Vα1 to 0 V and adds the correction value Vα1 to the target voltage Vs*. Herein, the magnitude of Vα1 (0.5 V) obtained when the remote voltage sensor S1 is abnormal is set to be larger than the voltage drop Vr caused due to interconnection resistance between the power conversion apparatus 10 and the electric load 60.

A first deviation calculation section 24c calculates the deviation Δ1 between the target voltage (Vs*+Vα1) corrected by the first correction section 23c and the remote voltage Vs. A PI control section 25c performs PI control based on the deviation Δ1 to calculate the first target current Iref1.

A second correction section 27c of the target current calculation section 21c compares the first target current Iref1 with the second target current Iref2. If a state where the first target current Iref1 is larger than the second target current Iref2 (when the remote voltage sensor S1 is abnormal) is maintained for a predetermined time period, the second correction section 27c sets the correction value Vα2 to 0 V and adds the correction value Vα2 to the target voltage Vs*. In addition, if a state where the second target current Iref2 is equal to or smaller than the first target current Iref1 (when the remote voltage sensor S1 is normal) is maintained for a predetermined time period, the second correction section 27c sets the correction value Vα to 0.5 V and adds the correction value Vα to the target voltage Vs*. Herein, Vα2 (0.5 V) obtained when the remote voltage sensor S1 is normal is set to be larger than the voltage drop Vr caused due to interconnection resistance between the power conversion apparatus 10 and the electric load 60.

A second deviation calculation section 28c calculates the deviation Δ2 between the target voltage (Vs*+Vα2) corrected by the second correction section 27c and the local voltage Vo. A PI control section 29c performs PI control based on the deviation Δ2 to calculate the second target current Iref2.

Current values of the first target current Iref1 and the second target current Iref2 calculated by PI control sections 25c, 29c, respectively, are limited so as to be current values within a range between a predetermined upper limit and a predetermined lower limit. Then, the minimum value selection section 31c selects a smaller one from the first target current Iref1 and the second target current Iref2 as the target current Iref and outputs the target current Iref to the peak current control section 22. Note that the calculation period of the first target current Iref1 is 20 μs, and the calculation period of the second target current Iref2 is 10 μs.

Hereinafter, an operation of the power conversion apparatus of the present embodiment is explained by using a timing diagram shown in FIG. 8.

At time T11, the remote voltage sensor S1 is normal, and the control based on the remote voltage Vs is performed. Hence, the remote voltage Vs and the target voltage Vs* are equal to each other.

At time T12, an abnormality is caused in the remote voltage sensor S1. When an abnormality is caused in the remote voltage sensor S1, the remote voltage Vs becomes 0V. Meanwhile, the local voltage Vo is a value obtained by adding the voltage drop Vr due to interconnection resistance to the target voltage Vs*. That is, the deviation Δ2 is smaller than the deviation Δ1. The second target current Iref2 is less than the first target current Iref1. Hence, the second target current Iref2 is selected as the target current Iref. As a result, the local voltage Vo approaches a value obtained by adding the correction value Vα2 (0.5 V) to the target voltage Vs*. Note that since the correction value Vα2 is a value larger than the voltage drop Vr due to interconnection resistance, the local voltage Vo increases by the difference between the correction value Vα2 and the voltage drop Vr.

At time T13, since a state where the second target current Iref2 is selected as the target current Iref is maintained for a predetermined time period, the correction value Vα2 changes from 0.5V to 0V. As a result, the local voltage Vo approaches the target voltage Vs*. As a result, the local voltage Vo decreases by 0.5 V. In addition, the correction value Vα1 changes from 0 V to −0.5 V.

At time T14, the remote voltage sensor S1 becomes normal. When the remote voltage sensor S1 becomes normal, the remote voltage Vs (=Vo−Vr=Vs*−Vr) becomes larger than the corrected target voltage (Vs*+Vα1). Hence, since the deviation Δ1 becomes a negative value, which is smaller than the deviation Δ2 (0V), the first target current Iref1 becomes smaller than the second target current Iref2. Hence, the first target current Iref1 is selected as the target current Iref. That is, the control based on the remote voltage Vs is performed.

At time T15, since a state where the first target current Iref1 is selected as the target current Iref is maintained for a predetermined time period, the correction value Vα changes from −0.5 V to 0V. Hence, the control for making the remote voltage Vs equal to the target voltage Vs* is performed.

Hereinafter, advantages of the present embodiments are described.

When an abnormality is caused in the remote voltage sensor S1, the correction is performed by which the correction value $V\alpha 1$ is subtracted from the target voltage $Vs^*$ so as to make the first target current Iref1 smaller. Thereby, when the remote voltage sensor S1 returns to normal, the first target current Iref1 based on the remote voltage Vs becomes a value smaller than the second target current Iref2 based on the local voltage Vo. Hence, the first target current Iref1 is selected as the target current Iref by the minimum value selection section $31c$ to perform the control based on the remote voltage Vs. Thereafter, since the correction for the remote voltage Vs or the target voltage $Vs^*$ is not performed, the target voltage $Vs^*$ and the remote voltage Vs become equal to each other. Accordingly, after an abnormality is caused in the remote voltage sensor S1, and when the remote voltage sensor S1 returns to normal, output voltage can be appropriately controlled.

(Other embodiments)

In the first to third embodiments, changing the correction value $V\alpha$ from 0 V to 0.5 V and changing the correction value $V\alpha$ from 0.5 V to 0 V may be performed without waiting a lapse of a predetermined time period. That is, the correction value $V\alpha$ may be changed simultaneously with the change of the remote voltage sensor S1 from an abnormal to normal and from normal to abnormal.

Instead of a full-bridge type inverter circuit, a half-bridge type inverter circuit may be provided. Similarly, instead of a half-bridge type rectifier circuit, a full-bridge type rectifier circuit may be provided. In addition, instead of a full-bridge type power conversion apparatus, a forward type or flyback type power conversion apparatus may be provided. In addition, instead of an insulated type power conversion apparatus, a non-isolated type power conversion apparatus may be provided.

Instead of peak current mode control, another current mode control such as average current mode control may be performed.

In the first and third embodiments, the detection period for the local voltage Vo and the detection period for the remote voltage Vs may be different from each other.

In the second and fourth embodiments, the detection period for the local voltage Vo and the detection period for the remote voltage Vs may be the same. In addition, the detection period for the remote voltage Vs may be shorter than the detection period for the local voltage Vo.

Hereinafter, aspects of the above-described embodiments will be summarized.

In the power conversion apparatus according to the present embodiment, an output terminal is connected to an electric load. The power conversion apparatus converts an input voltage and supplies an output voltage to the electric load. The power conversion apparatus includes: a semiconductor switch which switches between an open state and a closed state to regulate a voltage control current for controlling the output voltage; a first voltage detection section which detects a remote voltage which is applied to the electric load as the output voltage; a second voltage detection section which detects a local voltage which is applied to the output terminal as the output voltage; a target current calculation section which calculates a target current which is a target value of the voltage control current, based on a voltage deviation between a target voltage which is a target value of the output voltage and either the remote voltage or the local voltage; and a switch control section which controls the semiconductor switch so that the voltage control current becomes the target current, to regulate the output voltage to the target voltage. The target current calculation section calculates the target current by using whichever one of the remote voltage and the local voltage corresponds to a smaller target current.

The power conversion apparatus of the present embodiment is a power conversion apparatus using a current mode control scheme in which the target current is calculated based on the voltage deviation between the target voltage and a detection value of output voltage to control the semiconductor switches so that a voltage control current (e.g. a switch current flowing through the semiconductor switches) reaches the target current. Hence, the power conversion apparatus can perform the control with high responsiveness compared with a scheme in which a PWM signal is generated from the detection value of voltage.

The power conversion apparatus of the present embodiment detects output voltage by using the two voltage detection sections. Then, the power conversion apparatus calculates the target current based on the voltage deviations between one of the remote voltage and the local voltage, which are detection values obtained by the voltage detection sections, respectively, and the target voltage. Hence, even when an abnormality is caused in one of the detection sections, power output can be continued with good responsiveness. In addition, the power conversion apparatus calculates the target current by using one of the remote voltage and the local voltage by which the target current becomes smaller. Hence, when an abnormality is caused in one of the detection sections, output voltage can be restrained from varying. In addition, the target current calculation section is not required to use analog circuits, whereby the number of parts can be restrained from increasing.

In addition, when the target current based on the remote voltage and the target current based on the local voltage are switched therebetween, the power conversion apparatus using a current mode control scheme can restrain output voltage from being unstable.

It will be appreciated that the present invention is not limited to the configurations described above, but any and all modifications, variations or equivalents, which may occur to those who are skilled in the art, should be considered to fall within the scope of the present invention.

What is claimed is:

1. A power conversion apparatus whose output terminal is connected to an electric load, and which converts an input voltage and supplies an output voltage to the electric load, the power conversion apparatus comprising:
a semiconductor switch which switches between an open state and a closed state to regulate a voltage control current for controlling the output voltage;
a first voltage detection section which detects a remote voltage which is applied to the electric load as the output voltage;
a second voltage detection section which detects a local voltage which is applied to the output terminal as the output voltage;
a target current calculation section which calculates a target current, which is a target value of the voltage control current, based on a voltage deviation between i) a target voltage, which is a target value of the output voltage, and ii) either the remote voltage or the local voltage; and
a switch control section which controls the semiconductor switch so that the voltage control current becomes the target current, to regulate the output voltage to the target voltage, wherein the target current calculation section calculates the target current by using whichever one of the remote voltage and the local voltage corresponds to a smaller target current.

2. The power conversion apparatus according to claim 1, wherein
the target current calculation section calculates the target current by using the smaller of a voltage deviation between the remote voltage and the target voltage and a voltage deviation between the local voltage and the target voltage.

3. The power conversion apparatus according to claim 1, wherein
the target current calculation section calculates a first target current based on a voltage deviation between the remote voltage and the target voltage and a second target current based on a voltage deviation between the local voltage and the target voltage to select and use one of the first target current and the second target current as the target current, which is smaller than the other of the first target current and the second target current.

4. The power conversion apparatus according to claim 3, wherein
a detection period of the local voltage of the second voltage detection section is shorter than a detection period of the remote voltage of the first voltage detection section,
a calculation period of the first target current and the second target current of the target current calculation section is synchronized with the detection period of the local voltage of the second voltage detection section,
the target current calculation section calculates the first target current and the second target current by using proportional integral control, and
a gain of the proportional integral control in calculating the first target current with the target current calculation section is set to be smaller than a gain of the proportional integral control in calculating the second target current with the target current calculation section.

5. The power conversion apparatus according to claim 4, wherein
a ratio of a proportional gain in calculating the first target current by the target current calculation section to a proportional gain in calculating the second target current by the target current calculation section is set to be equal to an inverse ratio of the detection period of the remote voltage of the first voltage detection section to the detection period of the local voltage of the second voltage detection section.

6. The power conversion apparatus according to claim 3, further comprising a correction section
which performs a correction for adding a predetermined amount to the remote voltage so as to make the first target current smaller or which performs a correction for subtracting a predetermined amount from the target voltage on the condition that the second target current has been selected as the target current for a predetermined time period, and
which does not perform the correction on the condition that the first target current has been selected as the target current for a predetermined time period.

7. The power conversion apparatus according to claim 1, further comprising a correction section which performs correction so that a deviation between the local voltage and the target voltage increases by a predetermined amount on the condition that the first voltage detection section is normal, and which does not perform the correction on the condition that an abnormality has been caused in the first voltage detection section.

8. The power conversion apparatus according to claim 6, wherein the correction section uses, as the predetermined amount, a value larger than a product of a maximum value of output current of the power conversion apparatus and an interconnection resistance between the output terminal and the electric load.

9. The power conversion apparatus according to claim 1, wherein
a detection period of the remote voltage of the first voltage detection section and a detection period of the local voltage of the second voltage detection section are different from each other.

10. The power conversion apparatus according to claim 9, wherein
a detection period of the local voltage of the second voltage detection section is shorter than a detection period of the remote voltage of the first voltage detection section, and
a calculation period of the target current of the target current calculation section is synchronized with the detection period of the local voltage of the second voltage detection section.

* * * * *